(12) United States Patent
Mennig et al.

(10) Patent No.: US 12,355,218 B2
(45) Date of Patent: Jul. 8, 2025

(54) AUTOMATIC CUTTING MACHINE

(71) Applicant: ZOLLER & FRÖHLICH GMBH, Wangen im Allgäu (DE)

(72) Inventors: Michael Mennig, Bad Wurzach (DE); Marius Lang, Wangen im Allgau (DE); Gregor Koch, Aulendorf (DE); Hans Leupolz, Argenbühl (DE)

(73) Assignee: ZOLLER & FRÖHLICH GMBH, Wangen im Allgäu (DE)

( * ) Notice: Subject to any disclaimer, the term of this patent is extended or adjusted under 35 U.S.C. 154(b) by 345 days.

(21) Appl. No.: 18/019,116

(22) PCT Filed: Aug. 3, 2021

(86) PCT No.: PCT/EP2021/071662
§ 371 (c)(1),
(2) Date: Feb. 1, 2023

(87) PCT Pub. No.: WO2022/029119
PCT Pub. Date: Feb. 10, 2022

(65) Prior Publication Data
US 2023/0318269 A1 Oct. 5, 2023

(30) Foreign Application Priority Data

Aug. 6, 2020 (DE) ............... 10 2020 120 775.1
Mar. 26, 2021 (DE) ............... 10 2021 107 699.4

(51) Int. Cl.
*H02G 1/00* (2006.01)
*H01R 43/28* (2006.01)

(52) U.S. Cl.
CPC ............ *H02G 1/005* (2013.01); *H01R 43/28* (2013.01)

(58) Field of Classification Search
CPC ................................ H02G 1/005; H01R 43/28
See application file for complete search history.

(56) References Cited

U.S. PATENT DOCUMENTS

| 4,715,100 | A | | 12/1987 | Cross |
| 4,997,173 | A | * | 3/1991 | Folk ................. H01R 43/28 |
| | | | | 269/56 |

(Continued)

FOREIGN PATENT DOCUMENTS

| DE | 4440835 C1 | 8/1996 |
| DE | 19714964 C1 | 7/1998 |

(Continued)

OTHER PUBLICATIONS

International Search Report issued in the parent International Application No. PCT/EP2021/071662 on Nov. 10, 2021.

(Continued)

*Primary Examiner* — Sean M Michalski
(74) *Attorney, Agent, or Firm* — Mindful IP PLLC (57) ABSTRACT

An automatic cutting machine includes a feed for cables and a transport device for feeding a cable according to a predetermined cable length and a cutting device for cutting a cable to length. The automatic cutting machine has a multiple infeed which is designed to feed different cable cross-sections or cable types. The multiple infeed has a plurality of tubes which are each associated with a cable cross-section/a cable type and which are tiltably mounted on an adjusting slide.

18 Claims, 5 Drawing Sheets

(56) References Cited

U.S. PATENT DOCUMENTS

| | | | |
|---|---|---|---|
| 8,442,664 B1 | 5/2013 | Guglielmo et al. | |
| D1,026,590 S * | 5/2024 | Ruan | D8/51 |
| D1,029,601 S * | 6/2024 | Miao | D8/59 |
| 12,095,241 B1 * | 9/2024 | Chen | H02G 1/126 |
| 2005/0050713 A1 | 3/2005 | Locher et al. | |
| 2019/0066881 A1 | 2/2019 | Takada et al. | |
| 2019/0372319 A1 * | 12/2019 | Wang | H02G 1/1251 |
| 2021/0181704 A1 | 6/2021 | Fröhlich et al. | |
| 2022/0393446 A1 * | 12/2022 | Whipple | H02G 1/126 |

FOREIGN PATENT DOCUMENTS

| | | | |
|---|---|---|---|
| DE | 19831588 A1 | | 9/1999 |
| DE | 102004057818 | | 8/2006 |
| DE | 102015102060 A1 | | 8/2016 |
| DE | 102015119217 A1 | | 5/2017 |
| DE | 102017118968 A1 | | 2/2019 |
| DE | 102018131444 A1 | | 11/2019 |
| EP | 0675577 A2 | | 10/1995 |
| GB | 2142259 A | | 1/1985 |
| GB | 2277409 A | | 10/1994 |
| JP | S53129884 A | | 11/1978 |
| JP | S5750716 A | | 3/1982 |
| JP | S59138015 A | | 8/1984 |
| JP | S61277562 A | | 12/1986 |
| JP | H0395519 | | 4/1991 |
| JP | H07272816 A | | 10/1995 |
| JP | H10212068 A | | 8/1998 |
| JP | 2003323957 A | | 11/2003 |
| JP | 2013056762 A | | 3/2013 |
| JP | 2017216142 A | | 12/2017 |
| JP | 2021522663 A | | 8/2021 |
| KR | 1020170018203 A | | 2/2017 |
| KR | 1020170061336 A | | 6/2017 |
| KR | 1020190108981 A | | 9/2019 |
| KR | 1020190114147 A | | 10/2019 |
| WO | 9813907 A1 | | 4/1998 |
| WO | 2015182609 A1 | | 12/2015 |

OTHER PUBLICATIONS

International Written Opinion issued in the parent International Application No. PCT/EP2021/071662 on Nov. 10, 2021.
European Examination report issued in correlated application No. EP21754803.1 on Mar. 21, 2024 with English translation.
Notice of Allowance issued Feb. 21, 2025 in correlated Korean application No. 10-2023-7007481.
Office Action issued in correlated JP patent application 2023-507706 on Feb. 7, 2024.
Office Action issued Oct. 25, 2024 against correlated Japanese Application No. 2023-507706 with translation, 12 pages.

* cited by examiner

AUTOMATIC CUTTING MACHINE

CROSS REFERENCE TO RELATED APPLICATIONS

The present patent application is a national stage of, and claims priority to, PCT Application No. PCT/EP2021/071662, filed on Aug. 3, 2021, which application claims the priority of the German patent application 10 2020 120 775.1 filed Aug. 6, 2020, and German patent application 10 2021 107 699.4 filed Mar. 26, 2021, the disclosures of which are incorporated by reference in the present patent application in their entireties.

TECHNICAL FIELD

The disclosure relates to an automatic cutting machine according to the preamble of the independent claim.

INTRODUCTION AND BACKGROUND

Such an automatic cutting machine can be integrated, for example, in a modular cable processing center (WPC) for the assembly of cables.

The WPC can be used to feed cables, lines for control cabinet assembly, to cut them to length, to mark them, and to crimp them with a contact element, such as a wire-end sleeve. The assembled cables are then bundled in the usual way and stored in a storage system. Such a center is disclosed, for example, in U.S. Pat. No. 8,442,664 B1. The actual cable assembly is carried out by a unit which is configured as a special machine and enables the above-described work steps. Such a unit has an extremely complex structure and can only be adapted to different production tasks with great effort. Furthermore, such a special machine is relatively expensive and requires a large installation space within the production line.

A more flexible solution is to provide modular units instead of a special machine, on which the individual processing steps (cutting to length, marking, stripping, crimping, bundling) are then carried out by a worker. Crimping is carried out with a crimping machine, as known, for example, from patent specification DE 44 40 835 C1 of the Applicant, and is used, for example, to crimp wire-end sleeves with a stripped cable end. In the known solution, these wire-end sleeves are rolled up as a belt on a drum magazine and are conveyed from this via a transport unit to a crimping head. Alternatively, the wire-end sleeves or contact elements can also be held individually in a storage and can then be conveyed to the crimping head in a defined position via a suitable feed device. Such a feed device is described, for example, in DE 198 31 588 A1.

In the known solutions, the wire-end sleeve to be crimped is placed on the stripped cable end via a holding unit and then crimped via the crimping head. The cable end can be stripped either externally or via a stripping head integrated in the crimping machine.

The configuration of a transport unit for conveying the wire-end sleeves or other electrical components arranged on a belt is described, for example, in the Applicant's document G 93 08 266.5. A similar transport unit is also disclosed in DE 197 14 964 C1.

In series production, it is necessary to press different cable cross-sections and electrical components/contact elements together and then to install them in a subsequent mounting step, for example when mounting a control cabinet. In principle, there are two options for this: in one variant, the crimping machine is converted for pressing together different cable cross-sections and/or contact elements (wire-end sleeves), or several crimping machines are provided for processing the different cable cross-sections/contact elements. The first solution requires long set-up times and considerable manpower. This disadvantage is overcome in the latter solution with a large number of crimping machines—but the investment costs are considerable.

In document DE 10 2004 057 818 B3, a machine (configured as a stripper or crimper) is disclosed with which different cable cross-sections and wire-end sleeves can be processed. For each type of wire-end sleeve, a drum magazine and an associated crimping device are provided, to which a common drive is assigned, which can be selectively brought into operative engagement with one of the crimping devices. A solution of this kind requires a great deal of device-related effort, since a large number of crimping units has to be provided and controlled.

In DE 10 2015 119 217 A1, which originates from the Applicant, a crimping machine is shown with which the above-mentioned disadvantages are eliminated. This crimping machine has a storage system with several drum magazines, to which a common transport unit and a common crimping head are assigned, so that the device-related effort is significantly reduced compared to the solution described above.

In DE 10 2017 118 968, subsequently published by the Applicant, a crimping machine is disclosed in which a contact element to be crimped is guided directly into the effective range of a stripping or crimping head without the interposition of a feed device or the like. In this known solution, the contact elements are preferably stored in drum magazines, so that the crimping machine is accordingly configured with a separating device.

DE 10 2015 102 060 A1, also originating from the Applicant, shows a crimping machine in which different wire-end sleeves are stored in a storage system with several drum magazines. A transport unit is assigned to each of these drum magazines, via which the respective preselected wire-end sleeve is transported to a transfer position. The wire-end sleeve cut off there is then fed to a common crimping head via a shuttle.

This crimping machine is distinguished by its high productivity. However, a certain disadvantage is seen in the fact that the required shuttle has a comparatively complex configuration and takes up corresponding installation space, and stripping is not possible.

Under the designation 'UNICUT®', the Applicant offers a generic cutting machine which is suitable for cutting single-stranded and fine-stranded cables/lines with a cross-section of 0.08 to 10 $mm^2$. In this known solution, the cable to be cut to length is transported via a transport device with two frictionally engaged drive rollers according to the specified target length and is then cut off via a cutting device. The cable is fed from a cable storage, for example a cable reel, by the worker. The worker places the cut-to-length cables/lines in a buffer store, from which a worker removes the cut-to-length cables and feeds them to a crimping machine, in which the end portions of the cables are stripped and crimped with contact elements, for example wire-end sleeves.

Due to the high proportion of manual work, the demands on workers during assembly and in particular during the subsequent laying of cables in the control cabinet are relatively high, wherein errors cannot be ruled out.

DE 10 2018 131 444 of the Applicant describes an automatic cutting machine in which the feed is designed as a multiple infeed unit for several cable cross-sections or cable types, wherein a cable to be processed is oriented with respect to the feed or to the transport device of the automatic cutting machine via a control device. The multiple infeed unit is configured with an adjusting slide that can be moved, for example, transversely to the feed direction of the cable in order to orient the respective cable with respect to the transport device/cutting device.

One problem with such a solution is the exact orienting of the respective cables in relation to the transport device/cutting device.

SUMMARY

In contrast, the disclosure is based on the object of creating an automatic cutting machine in which the cable feed can be carried out reliably with little device-related effort.

This object is solved by an automatic cutting machine with the features of the independent claim.

Advantageous further developments of the disclosure are the subject matter of the dependent claims.

DESCRIPTION

The automatic cutting machine according to the disclosure has a multiple infeed unit for several cable cross-sections or cable types, to which a transport device for feeding the cable according to a predetermined cable length and a cutting device for cutting the cable to length are assigned. The multiple infeed unit is arranged on an adjusting slide, which is preferably movable transversely to a feed direction of the cable, wherein the cable to be processed is oriented with respect to the transport device or the cutting device.

According to the disclosure, the multiple infeed unit has a plurality of tubes or 'pipes' tiltably mounted on the adjusting slide, which are each assigned to a cable cross-section and/or a cable type and in which the respective cable or the respective line is guided and which are mounted on the adjusting slide in such a way that they are selectively adjustable or tiltable from a base position via an actuating device into a working position in which the cable guided in the tube is oriented with respect to the transport device or the cutting device.

Thus, at least a selected one of the tubes is positionable to the transport device or the cutting device in such a way that an operative engagement of the cable guided therein with the transport device or the cutting device is enabled, while the other, unactuated tubes remain positioned in such a way that no such operative engagement of their cables is enabled. The tubes and their selectable actuation into the working position thus ensure a reliable guide of the respective cable to the transport device/cutting device, so that malfunctions due to an incorrect relative positioning of the cables to be cut are excluded.

In a preferred further development, the tubes can only be selectively actuated individually by the actuating device. In a conceivable alternative, at least two of the tubes can be selectively actuated simultaneously by the actuating device.

In a further development, a reliable guide of the respective cable to the transport device/cutting device is ensured by a parallel arrangement of the tubes, in particular in the manner of an organ pipe, so that malfunctions due to incorrect relative positioning of the cables to be cut are excluded.

The tubes may have an open or closed profile. Preferred are tubes (also called guide tube) that have a round cross-section.

In a particularly preferred configuration example, the tubes are mounted on a common tilting axis.

Tilting/pivoting is particularly easy if an actuation portion of the tubes remote from the transport device or the cutting device is extended beyond the tilting axis. This actuation portion is then engaged by an actuating device for tilting the respective tubes.

In one possible configuration example, this actuating device is configured as a lifting cylinder, in particular as an electropneumatic lifting cylinder, wherein one lifting cylinder is assigned to all tubes.

Alternatively, the actuating device may be configured as an electric motor, in particular a stepper motor, wherein the motor is again assigned to all tubes.

Regardless of the type of actuating device, the tube or 'pipe' to be actuated is positioned within the operating range of the actuating device by moving the adjusting slide. In particular, an actuator, linear actuator, or linear drive is provided for moving purposes.

The actuation of the tubes or 'pipes' via the actuating device is selective.

In particular, the actuating device is fixed in position or in the housing.

The automatic cutting machine is constructed particularly short if, in a further development, the tubes in their base position project at least in sections beyond the transport device in the feed direction.

In order to be able to tilt the tube, which guides the cable to be cut off, into the working position without collision, the transport device has a recessed, free entry region in a further development. In the working position, the tube, in particular an opening section of the tube from which the cable to be cut off emerges, then projects into the entry region.

In a preferred further development, the entry region is bounded on both sides by peripheral surfaces of rotatable feed rollers of the transport device. The peripheral surfaces are preferably provided with a structuring, for example with ribs, corrugations, knobs or the like extending transversely to the feed direction, to improve the operative engagement and clamping of the cable. The peripheral surfaces may have a simple cylindrical shape or—for improved guide of the cable—a concave shape.

The transfer of the respective cable to the transport device is particularly simple if this is configured with two feed rollers which are movable apart and between which the cable is positioned, in particular in the entry region, by tilting the respective tube/'pipe'. Alternatively, one of the feed rollers is stationary and only the other feed roller is movable away from it.

Preferably, both feed rollers are rotatable, in particular rotatably drivable.

In a further development of the first alternative, both feed rollers for clamping the cable can be moved in opposite directions, i.e. towards each other, in particular transversely or perpendicularly to the feed direction; in the case of the second alternative, this is only one of the feed rollers.

In order to be able to feed the cable to be cut to the cutting device quickly and in a controlled manner, in one further development, a guide device is provided which extends in the form of a tube, channel, or tunnel between an opening of the transport device and a cutting zone of the cutting device.

In a further development, the feed rollers of the transport device are rotatably drivable against the feed direction in order to remove a cable supply of a cable that was last cut to length from a cutting zone of the cutting device and to free it for cutting another cable to length.

The removal of the cut-to-length cable is particularly easy if a transport chute is assigned to the cutting device.

In a further development, the multiple infeed unit, the transport device and/or the cutting device is or are covered by a common cover or by a respective cover. In this way, disruption of the cutting process by falling material or unintentional interference is prevented and in particular operating personnel are protected from injury. The cover is preferably transparent and in particular made of splinter-free material. In this way, the cutting-to-length process can be monitored automatically or by operating personnel, and in the event of a defect, an initial visual inspection is possible without having to remove the cover.

In a further development, the automatic cutting machine has an optical monitoring unit whose field of vision covers at least the multiple infeed unit, the transport device, the cutting device and/or the transport chute.

For threading the respective cable into its associated tube, the cover of the multiple infeed unit in a further development has a respective through passage for each tube and is preferably formed as an elongated hole to simplify threading.

In order to enable standardized and process-reliable threading, it is preferably always carried out in the same position of the adjusting slide, preferably in a stop position or end position of the adjusting slide relative to the adjustment direction.

In a further development, the through passages are therefore arranged on a portion of the cover of the multiple infeed unit below which a stop position or end position of the adjusting slide lies relative to its adjustment direction.

In a further development, the multiple infeed unit, with or without the actuating device, is arranged as a module that is detachable from the transport device and the cutting device or as a separate module. In both cases, detachable or separate, this offers the possibility that different multiple infeed units can be easily exchanged in a modular fashion, for example in terms of the number and/or diameter of the tubes. This means that the same transport and cutting device can be used to cut different combinations of cables to length, and only the modularly interchangeable multiple infeed unit has to be replaced.

In a possible further development, at least one fastening means for a detachably-designed, single feeding unit is formed or arranged in a space portion of the automatic cutting machine containing the working position, in particular in the above-mentioned entry region. If necessary, and in particular in the case of a modular, detachably-designed multiple infeed unit, this means that the machine can be quickly converted back to a single feeding unit.

In a further development, the automatic cutting machine therefore has a separate single feeding unit for detachable mounting in the space portion and on the at least one fastening means. Preferably, the modularly-detachable multiple infeed unit is pre-assembled and the single feeding unit is included in the scope of delivery of the automatic cutting machine.

A method of cutting cables to length with an automatic cutting machine configured according to at least one aspect of the preceding description, according to the disclosure, has at least the steps of: selecting a cable to be cut by adjusting the adjusting slide such that the tube associated with the cable is orientable with respect to the transport device or the cutting device, and; orienting said tube by tilting it from its base position to its working position via the actuating device.

For cutting to length, the steps of transporting a cable section of predetermined length to the cutting device via the transport device; cutting the cable portion via the cutting device, and; discharging the cable portion, in particular via the transport chute.

The steps can be repeated with the same or variable predetermined length.

If another cable is to be cut to length or if a neutral starting position of the automatic cutting machine is simply to be restored, the method comprises the steps of: retracting the last cable cut to length against the feed direction, in particular via the transport device, and; tilting the associated tube from the working position to the base position via the actuating device.

If another cable is now to be cut to length, the aforementioned steps of selecting to removing follow for this cable.

The Applicant reserves the right to direct an independent claim to a method which, according to the disclosure, comprises at least the above-mentioned steps of selecting the cable to be cut to length in such a way that the tube associated with the cable can be oriented with respect to the transport device or the cutting device, and; orienting this tube by tilting it from its base position into its working position.

Preferably, the automatic cutting machine described above has a control unit in which the method according to the disclosure is stored for execution.

In a simplified example, an automatic cutting machine is possible which, in contrast to the one presented here, has a feeder with only one tube/pipe which can be actuated by the actuating device from the base position to the working position. The Applicant reserves the right to make a separate claim for such an automatic cutting machine. The tiltable support of the only one tube/pipe according to the disclosure in this case does not necessarily have to be arranged on an adjusting slide according to the automatic cutting machines described above, but it may, for example, be arranged stationary or fixed to the housing.

BRIEF DESCRIPTION OF DRAWINGS

Preferred configuration examples of the disclosure are explained in more detail below with reference to schematic drawings. The following is shown.

DESCRIPTION OF DRAWINGS

Figure 1:
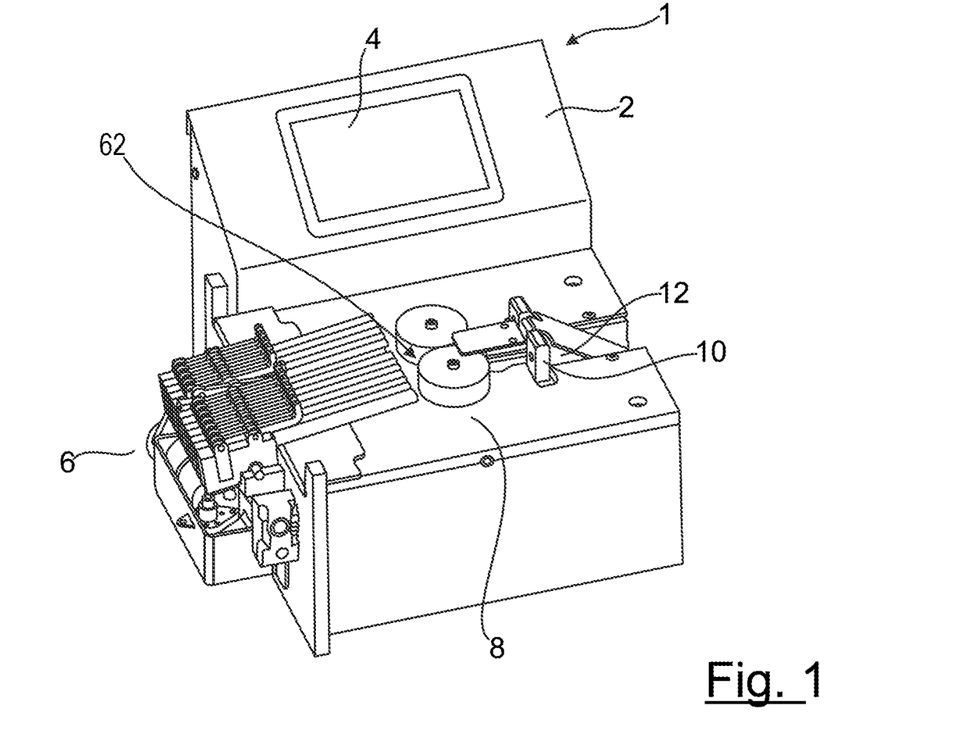
FIG. 1 shows a three-dimensional representation of a first configuration example of an automatic cutting machine according to the disclosure.

FIG. 1 shows a three-dimensional representation of an automatic cutting machine, such as can be used in a wire processing center (WPC). Such a WPC is explained in the prior art described at the beginning.

In the illustration according to FIG. 1, the automatic cutting machine 1 is shown only partially with the housing elements removed. Accordingly, the automatic cutting machine 1 has a panel 2 on which, for example, a display 4 is arranged on which the essential processing parameters are shown. The automatic cutting machine 1 is driven, for example, by an IPC that is equipped with suitable software for controlling the automatic cutting machine 1 and other components of the WPC. According to the representation in FIG. 1, the automatic cutting machine 1 furthermore has a multiple infeed unit 6, via which different cable cross-sections/cable types can be fed. Not shown are cable reels on which the respective cables are arranged and which are oriented with respect to the multiple infeed unit 6. The cables are transported via a transport device 8, via which the respective cable to be cut is fed to a cutting device 10. The transport device 8 is driven in such a way that the respective cable is cut to the predetermined cable length. In the concept according to the disclosure, the cut-to-length cable is then fed along a slide 12 to the next processing step, for example to a crimping machine or the like.

Figure 2:
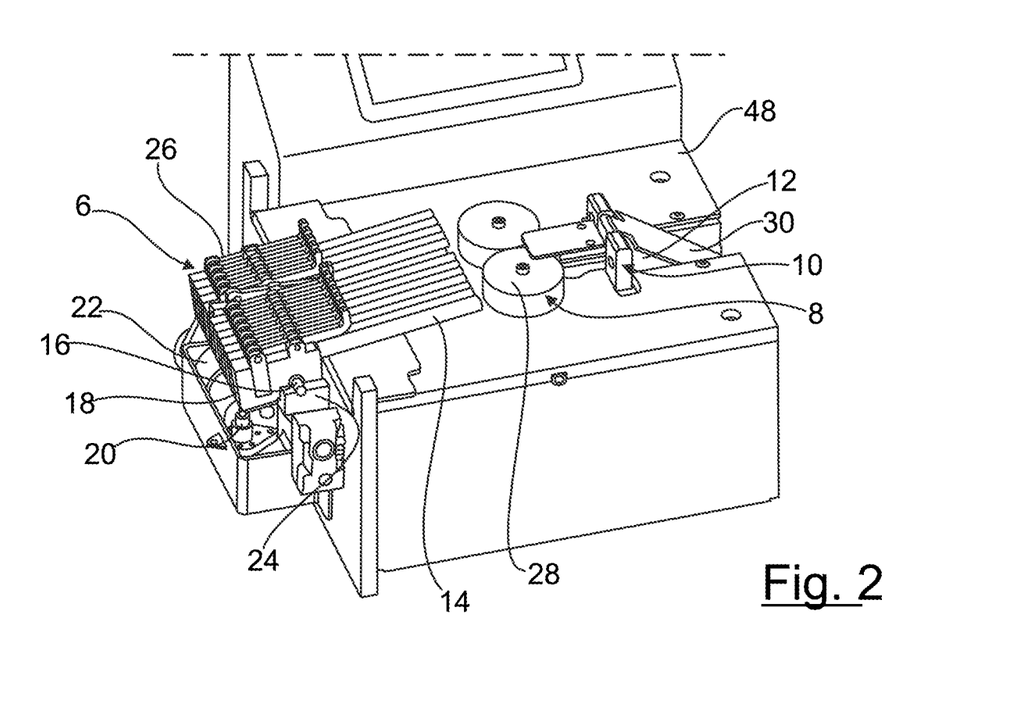
FIG. 2 shows an enlarged representation of the automatic cutting machine of FIG. 1.

FIG. 2 shows an enlarged representation of the functional components of the automatic cutting machine 1 according to FIG. 1. It can be seen in this representation that the multiple infeed unit 6 is formed with a plurality of tubes 14 arranged parallel to each other, the cross-section of which is adapted to the respective cable cross-section or to the respective cable type. The tubes 14 have the same length and are mounted tiltably on a tilting axis 16. In the configuration example shown, each tube 14 has a solid actuation portion 18 which is mounted on the tilting axis 16 and which, in the representation according to FIG. 2, extends to the left beyond the tilting axis 16. The free end portions of the tubes 14 point in the direction of the cutting device 10. The actuation portion 18 of the tubes 14 is configured, for example, in such a way that the weight of the actuation portion 18 forces these tubes 14 into the basic position shown, in which the end portions facing the cutting device 10 point upwards. However, the actuation in the direction of the basic position may also be affected by a spring arrangement, a lever arrangement, controlling elements or the like. From this basic position, one of the tubes 14 can be tilted via a lifting cylinder 20 so that the respective opening of the tube 14 is tilted downward and the cable guided in this tube 14 is oriented accordingly with respect to the cutting device 10. The relative positioning of the respective tube 14 in the transverse direction (transverse to the conveying direction) is carried out via a linear actuator or linear drive 22, which will be explained in more detail below. Said actuator engages an adjusting slide 24 on which the tubes 14 are mounted with the tilting axis 16. In the configuration example shown, the multiple infeed unit is configured for thirteen cable cross-sections/cable types and accordingly also has thirteen tubes 14. Of course, the number of tubes 14 is not limited to thirteen and a number of tubes 14 required for the respective application may be provided.

In the configuration example described, a tilting lever 26 is also assigned to each of the tubes 14 and runs at a parallel distance from the respective tube 14.

The transport device 8 is configured, for example, with two feed rollers 28 that can be moved apart to insert the respective cable and then moved together into operative engagement with the respective cable.

Via this transport device 8, the respective cable with the predetermined cable length is pulled off the reel and then cut off via the cutting device 10. This is configured in a known manner with two cutting blades that can be moved towards each other.

Figure 3:
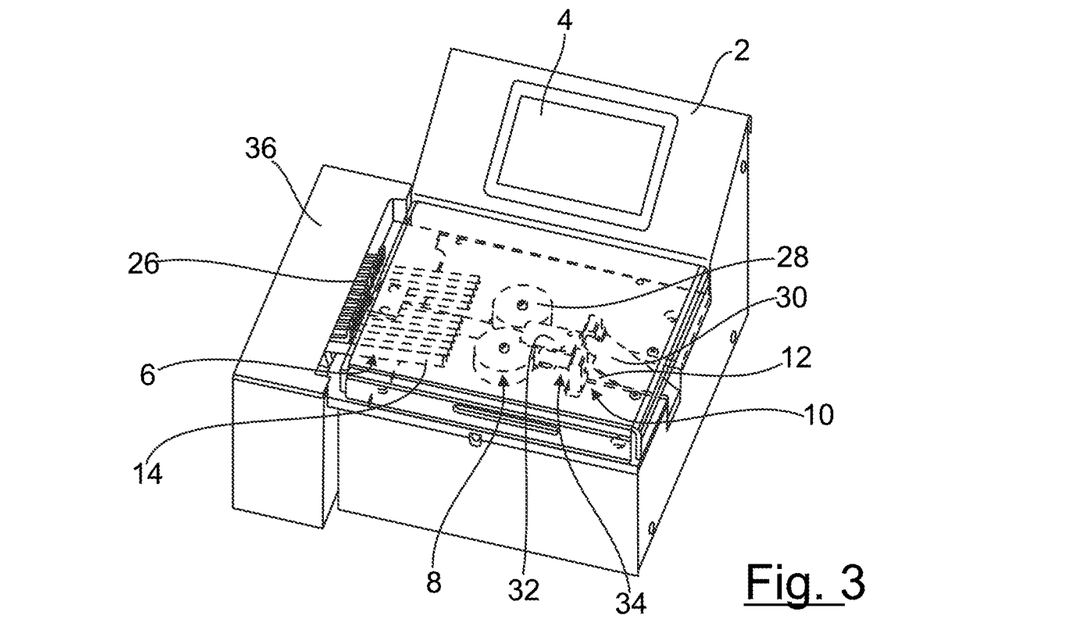
FIG. 3 shows a top view, oblique from above, of the automatic cutting machine according to FIGS. 1 and 2.

FIG. 3 shows a view corresponding to FIG. 2, wherein the linear drive 22 with the adjusting slide 24 (cf. FIG. 2) are covered by a housing cover 36, so that only end portions of the tilting lever 26 are visible. It can be seen in this representation that one of the tubes 14 is tilted out of the row and into its working position, in which its opening is oriented with respect to the two feed rollers 28 of the transport device 8.

In the representations according to FIGS. 1 to 3, covers 30, 32 of the slide 12 and of a guide 34 between the cutting device 10 and the transport device 8 are also shown.

Figure 4:
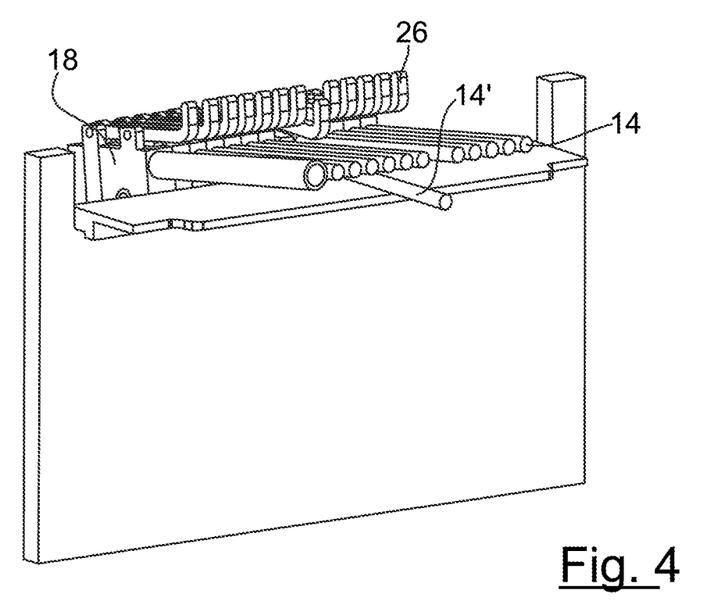
FIG. 4 shows a schematic diagram of a multiple infeed unit according to the disclosure.

FIG. 4 shows a schematic diagram of the multiple infeed unit 6 with a total of thirteen tubes 14, wherein one 14' of the tubes 14—as already mentioned—is tilted downwards into the working position. It is also clearly visible that the tubes 14 are configured with different cross-sections in order to be able to guide different cable types/cable cross-sections accordingly. In this representation it is also clearly visible that the tilting lever 26 is tilted downwards with the tube 14' in the working position.

Of course, the number of tubes or pipes may be different from thirteen, for example twelve or fourteen, but in particular may be adapted to the particular application.

Figure 5:
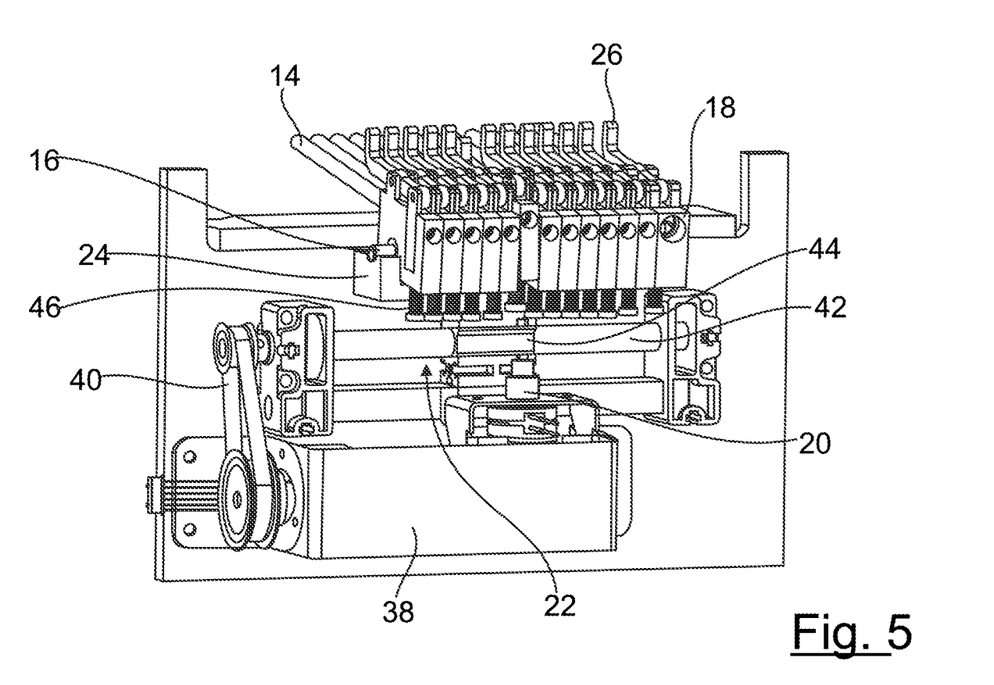
FIG. 5 shows a detailed view of the automatic cutting machine according to FIGS. 1 to 3.

FIG. 5 shows a view of the linear drive 22. This linear drive 22 has a drive motor 38, which in particular is configured as an electric motor, which is connected via a belt drive 40 to a spindle 42, on which a spindle nut 44 is guided, which in turn is in operative connection with the adjusting slide 24. Accordingly, the stroke of the spindle nut 44 is transmitted directly to the adjusting slide 24. In the configuration example shown, a supporting spring 46 is assigned to each of the actuation portions 18 of the tubes 14. According to FIG. 5, the rear actuation portion (sixth position from the left according to FIG. 5) extended beyond the tilting axis 16 is pivoted upward via the lifting cylinder 20 in order to tilt the tube 14 shown in the central area into the working position.

Figure 6:
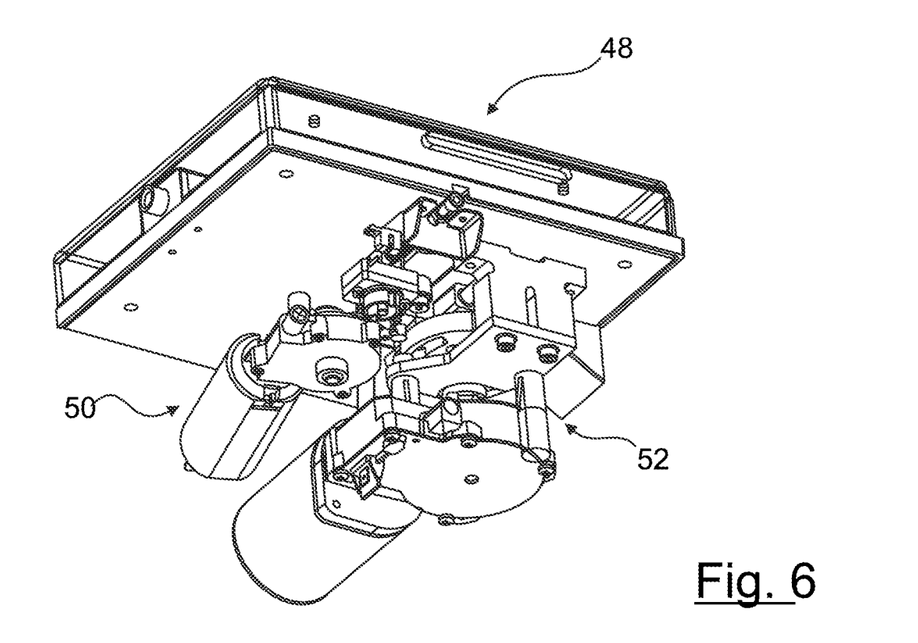
FIG. 6 shows a further detailed view of the automatic cutting machine according to FIGS. 1 to 3.

Finally, FIG. 6 shows a view from below of the multiple infeed unit 6, the transport device 8, and the console 48 accommodating the cutting device 10 (see FIG. 2). In this representation, a rotary drive 50 of the two feed rollers 28 of the transport device 8 and a drive 52 of the cutting device 10 can be seen.

Figure 7:
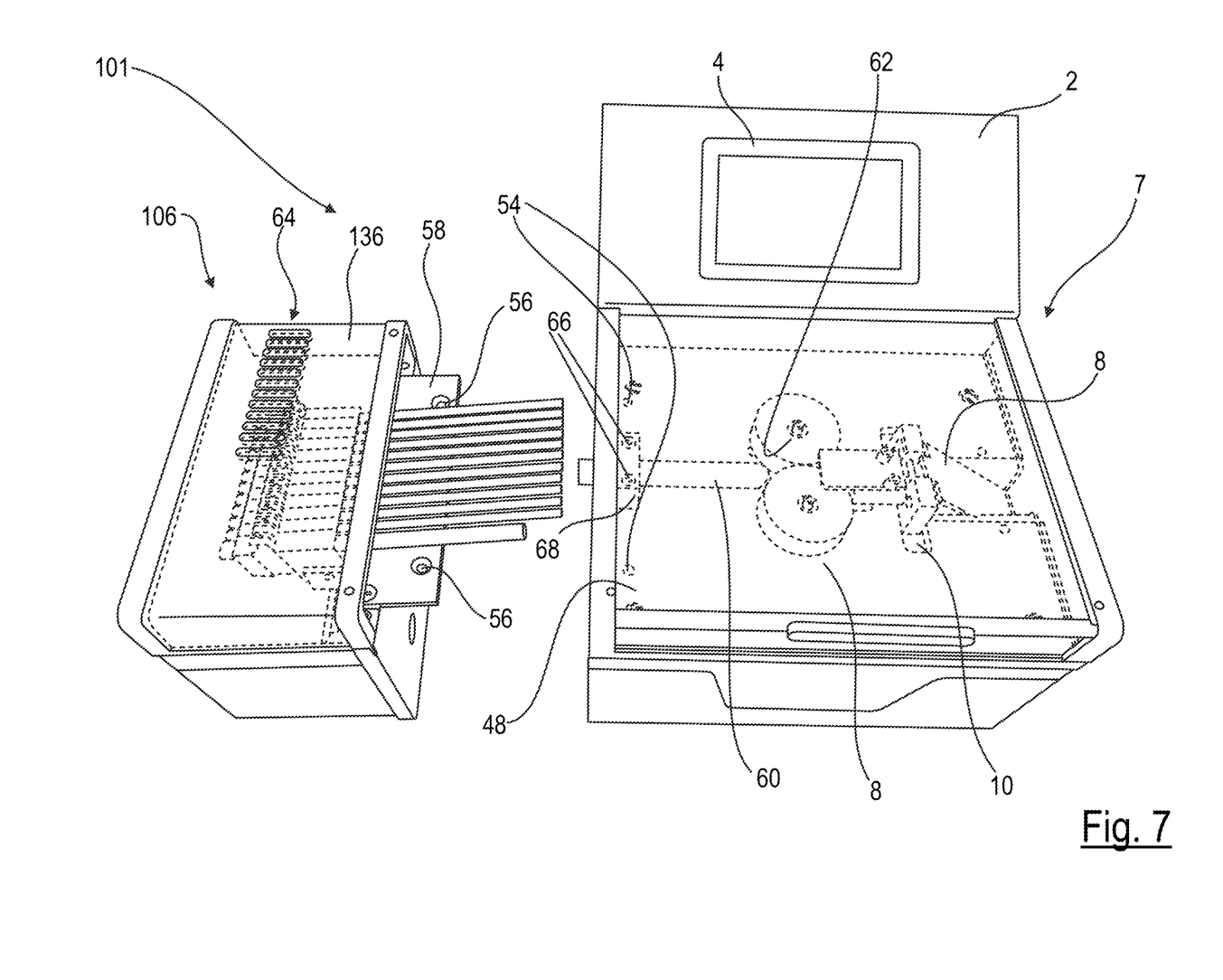
FIG. 7 shows a three-dimensional representation of a second configuration example of an automatic cutting machine according to the disclosure.

FIG. 7 shows a second configuration example of a modular automatic cutting machine 101. In the following, only differences to the first configuration example will be discussed for simplification. The modular multiple infeed unit 106 is provided for easy detachable fastening to a base body 7 of the automatic cutting machine 101 carrying the transport and cutting devices 8, 10. FIG. 7 shows the disassembled state of the multiple infeed unit 106, moved away from the base body 7. For fastening the modular multiple infeed unit 106 to the console 48, the latter has two thread holes 54 at the edge. Through holes 56 are provided on a mounting flange 58 of the multiple infeed unit 106 so that the mounting flange 58 can be fastened to the console 48 using fastening screws (not shown).

In addition to the first configuration example, a single feeding unit 60, in the configuration example configured as a rigid guide tube, is detachably preassembled on the console 48 as shown in FIG. 7. It should be noted that this represents an optional conversion of the multiple infeed unit according to the disclosure to a rigid single feeding unit. Similar to the tube 14' of the multiple infeed unit 6; 106, which is tilted into the working position, the single feeding unit 60 opens out into an entry region 62 of the transport device 8, which is laterally bounded by the peripheral surfaces of the rotatably drivable feed rollers 28. By loosening two screws 66 and the bridge 68 held thereby, the single feeding unit 60 is removable and the installation space is freed for the assembly of the multiple infeed unit 106 briefly described above.

Figure 8:
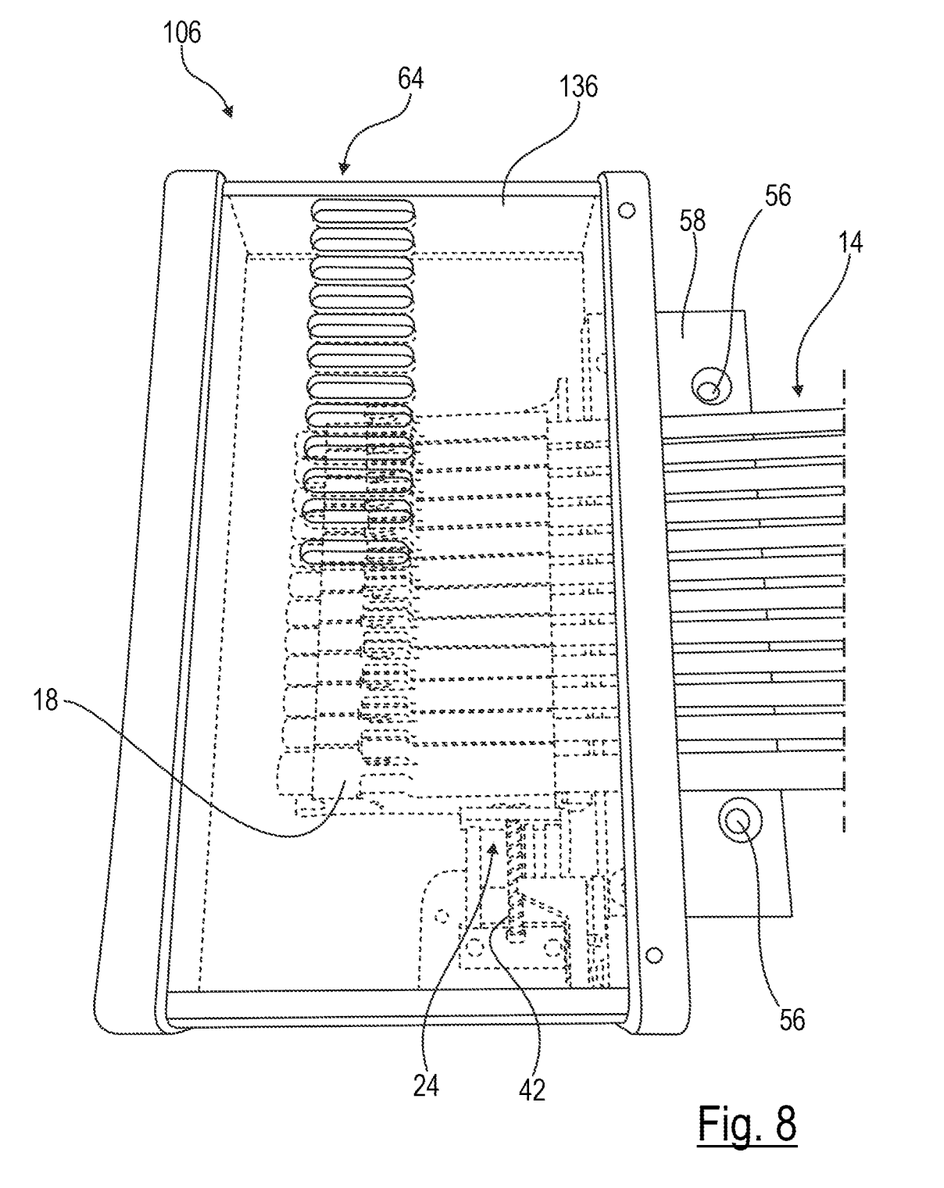
FIG. 8 shows an enlarged representation of the multiple infeed unit of the automatic cutting machine according to FIG. 7.

FIG. 8 shows the multiple infeed unit 106 of the automatic cutting machine 101 according to FIG. 7 in enlarged representation. The adjusting slide 24 is in a central position with respect to its adjustment region. It can be seen that a housing cover 136 is transparent, unlike in the first configuration example. On the other hand, in a region of the housing cover 136 that corresponds to one of the possible end positions of the adjusting slide 24 in the adjustment direction, elongated hole-shaped through passages 64 are formed, each of which is assigned to one of the tubes 14 located there in the end position. Via the through passages 64, it is thus possible to thread the respective cable into the associated tube 14. The spindle 42 of the linear drive for adjusting the adjusting slide 24 is also clearly visible.

Disclosed is an automatic cutting machine with a multiple infeed unit configured to feed different cable cross-sections or cable types. The multiple infeed unit has a plurality of tubes, each of which is assigned to a cable cross-section/cable type and which are tiltably mounted on an adjusting slide.

What is claimed is:

1. An automatic cutting machine with a feed for cables and a transport device for feeding a cable according to a predetermined cable length and with a cutting device for cutting the cable to length, wherein the feed is configured as a multiple infeed unit for several cable cross-sections and/or cable types, wherein the multiple infeed unit has an adjusting slide wherein the multiple infeed unit has a plurality of tubes tiltably mounted on the adjusting slide, which are each assigned to a cable cross-section or respectively a cable type and which are tiltable via an actuating device from a base position into a working position in which the associated cable is oriented with respect to the transport device or the cutting device.

2. The automatic cutting machine according to claim 1, wherein the tubes are mounted on a tilting axis.

3. The automatic cutting machine according to patent claim 1, wherein an actuation portion of the tubes remote from the transport device is extended beyond a tilting axis, wherein the actuating device engages the actuation portion of the tubes.

4. The automatic cutting machine according to claim 1, wherein the actuating device is configured as a lifting cylinder, in particular an electropneumatic lifting cylinder, or as an electric motor, in particular a stepper motor.

5. The automatic cutting machine according to claim 1, wherein at least some of the tubes in the base position project beyond the transport device in the feed direction.

6. The automatic cutting machine according to claim 1, wherein the tube in the working position projects into or towards an entry region of the transport device.

7. The automatic cutting machine according to claim 6, wherein the entry region is bounded on both sides by peripheral surfaces of rotatable feed rollers of the transport device.

8. The automatic cutting machine according to claim 1, wherein the transport device is configured with two feed rollers which are movable apart, or with one feed roller being stationary and one feed roller which is movable away from the feed roller.

9. The automatic cutting machine according to claim 1, wherein the transport device is drivable in the feed direction and against the feed direction.

10. The automatic cutting machine according to claim 1, with a transport chute for cut-to-length cables arranged downstream of the cutting device.

11. The automatic cutting machine according to claim 1, wherein the multiple infeed unit, the transport device and/or the cutting device is or are covered by a common cover or by a respective cover.

12. The automatic cutting machine of claim 11, wherein the cover of the multiple infeed unit has a through passage for each tube disposed therebelow.

13. The automatic cutting machine according to claim 12, wherein the through passages are arranged on the cover according to an end position of the adjusting slide.

14. The automatic cutting machine according to claim 1, wherein the multiple infeed unit is arranged with the actuating device as a module that is detachable or separate from the transport device and the cutting device.

15. The automatic cutting machine according to claim 14, wherein at least one fastening means for a detachably-designed single feeding unit is formed in a space portion containing the working position.

16. The automatic cutting machine according to claim 14, wherein at least one fastening means for a detachably-designed single feeding unit is formed in a space portion containing the working position.

17. The automatic cutting machine according to claim 2, wherein the tubes are mounted in parallel arrangement.

18. The automatic cutting machine according to claim 4, wherein the actuating device is configured as an electropneumatic lifting cylinder or as a stepper motor.

* * * * *